Sept. 26, 1939.   A. J. SCHWISOW   2,173,953
HOLDING DEVICE
Filed Aug. 6, 1937
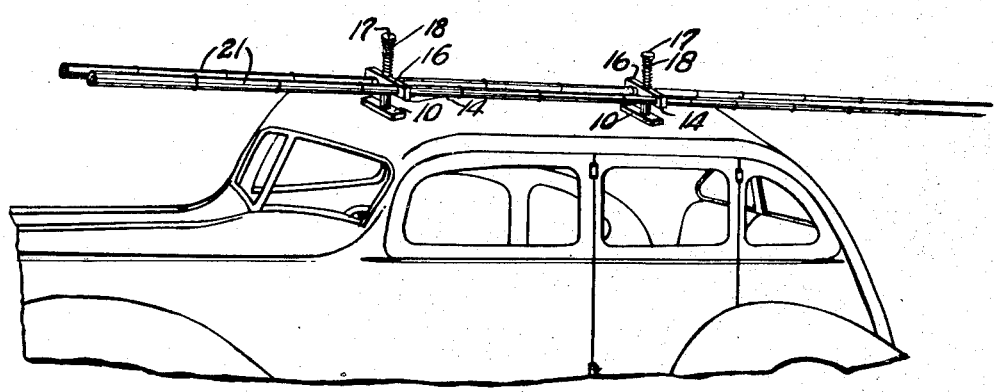
Fig. 1.
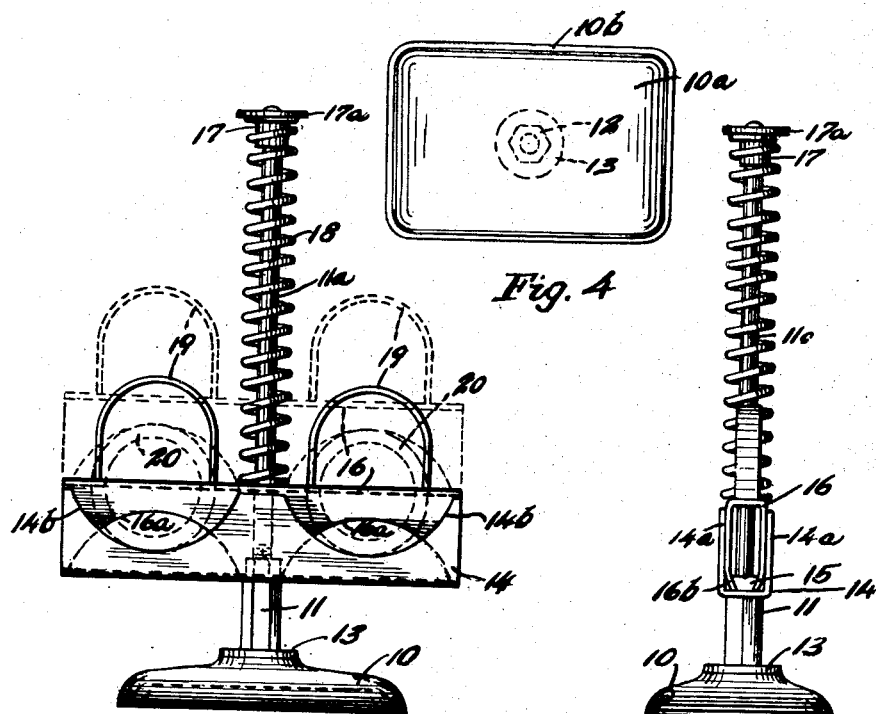
Fig. 2.
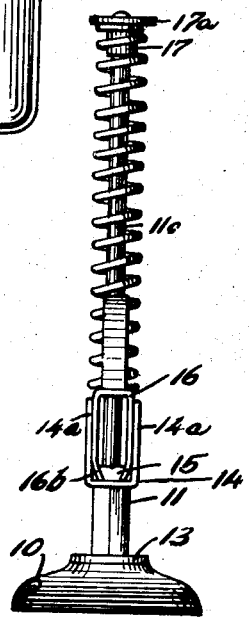
Fig. 3.
Fig. 4.
Inventor
ARNOLD SCHWISOW
By Chas. B. Reiff
Attorney.

Patented Sept. 26, 1939

2,173,953

UNITED STATES PATENT OFFICE 2,173,953

HOLDING DEVICE

Arnold J. Schwisow, Hopkins, Minn.

Application August 6, 1937, Serial No. 157,724

4 Claims. (Cl. 211—60)

This invention relates to a holding device and while the same might be used to hold various articles and articles of various shapes, in the embodiment of the invention illustrated it is shown as constructed and arranged to hold a tubular article or articles. Such a holding device has great utility in holding fishing poles. It is often desired to carry fishing poles on an automobile and this is rather inconvenient due to the usual long length of the poles. With such a holding device as disclosed herein, the poles can be conveniently carried on top of the automobile. The holding device is provided with a base constructed and arranged to grip the top of the automobile and hold the device in place.

It is an object of the invention, therefore, to provide a holding device having a base member preferably constructed and arranged to grip a smooth supporting surface and which carries opposing members resiliently urged together each of which has a recess or recesses adapted to receive and grip a tubular article such as a fishing pole.

It is another object of the invention to provide a holding device having opposed members with resilient means urging the same toward each other, said members being constructed and arranged to grip one or more tubular articles together with means for readily separating said members for the insertion or removal of said articles.

These and other objects and advantages of the invention will be fully set forth in the following description made in connection with the accompanying drawing in which like reference characters refer to similar parts throughout the several views and in which—

Fig. 1 is a perspective view showing a pair of the devices on top of an automobile carrying a pair of fishing poles;

Fig. 2 is a view in side elevation of the holding device, some parts being shown in different positions in dotted lines;

Fig. 3 is a view in end elevation of the device; and Fig. 4 is a bottom plan view of the device.

Referring to the drawing, a holding device is shown comprising a base member 10. While this base member may be variously formed and be adapted to be secured to a supporting surface in various ways, in the embodiment of the invention illustrated, it is shown as in the form of the well known vacuum cup. The base is shown as of general rectangular form and plan and on its underside has a recess 10a about which extends a comparatively thin and flexible rim 10b. A standard 11 preferably made of metal and which is illustrated as hexagonal in cross section extends into the top of base member 10 centrally thereof and has a reduced portion at its lower end which receives a nut 12. Washers 13 engage the top portion of cup member 10 therebetween so that said cup member is gripped between said washers and securely held by the nut 12. The bottom surface of the cup extends over the nut 12 and washer 13 as shown in Fig. 4. The surface of the recess 10a is therefore smooth. Base member 10 is made of comparatively soft rubber or similar material. Standard 11 extends some distance above base member 10 and has an upper reduced portion 11a of circular form. This forms a shoulder with the lower hexagonal portion of said standard and a member 14 of channel-shape is centrally apertured to have portion 11a pass therethrough and the web of said channel member rests on said shoulder. Portion 11a is threaded adjacent said shoulder and a nut 15 is screwed thereon against channel member 14 and between the sides thereof to hold said members securely in position. The sides 14a of member 14 project vertically and as shown in Fig. 2, member 14 extends to both sides of portion 11a being centrally disposed thereon. The sides 14a are each provided with a concave recess 14b, there being a recess at either side of the standard 11 and at equal distances therefrom. Another channel member 16 is provided which is inverted or disposed oppositely to channel member 14. The web of channel member 16 is centrally apertured to have the portion 11a extend therethrough and member 16 is slidable on said portion. The sides of channel member 16 extend vertically and they are spaced a distance so that said channel may be received within the side portions 14a of channel member 14. The sides of channel member 16 are each provided with a concave recess 16a, there being one of said recesses at each side of the standard 11 and at equal distances therefrom. Recesses 16a are in vertical alignment with recesses 14b and as clearly shown in Fig. 2, are disposed oppositely thereto. The ends of channel member 16 at the outer sides of recesses 16a are bent toward each other adjacent their free ends as shown at 16b in Fig. 3. Portion 11a extends some distance above members 14 and 16 and has at its upper end a sleeve 17 having a horizontally disposed disk 17a at its upper end. Member 17 is secured to the portion 11a and the latter is riveted over the disk 17a at its upper end. A coiled compression spring 18 surrounds portion 11a, the same surrounding sleeve 17 at its upper end and bearing against the underside of disk 17a. At its lower end, spring 18 engages the top of channel member 16. Loop members 19 having vertical sides and semi-cylindrical upper ends are secured to the top of member 16 in vertical alignment with the recess 16a and form finger holds for raising member 16.

In operation, the device will be affixed to the supporting surface by pressing down very firmly with considerable force on the base member 10. Said member is thus flattened against the surface and in attempting to resume its normal shape due to its resiliency, a vacuum or partial vacuum is created therein and it is held very securely to the supporting surface by the air pressure. When the tubular articles such as the fishing poles are to be inserted, the operator will place his fingers in the members 19 and let the base of his hand rest upon the top of disk 17a. Members 16 can then easily be lifted against the tension of spring 18. The lifted position of members 16 and 19 is indicated in dotted lines in Fig. 2. With member 16 lifted the articles indicated in Fig. 2 as 20 or the fishing poles indicated in Fig. 1 as 21 may be inserted between members 14 and 16 in the recesses 14b and 16a. After the articles are thus inserted, member 16 can be released and spring 18 will force the same toward member 14 so that said articles will be firmly gripped between members 14 and 16. The sides of the channel members 14 and 16 are spaced some distance between said recesses and engage said articles at longitudinally spaced points thereon. The articles are thus securely held in position.

In Fig. 1 two of the holding devices are shown secured on the top of an automobile and in alignment longitudinally of said top. The fishing poles 21 extend between and are gripped in both of said holding devices. The poles can thus be easily and conveniently carried on top of the automobile. The poles are rigidly hold so that they will have no movement and there will thus be no rattling of the poles. The devices are firmly held on the top of the automobile and will not be loosened by any motion or jarring of said automobile.

From the above description it is seen that applicant has provided a very simple, inexpensive and easily operated holding device for articles of tubular form. The parts are very few and can be easily made and assembled. The articles are securely held in position and can be easily carried in the device. The base member 10 makes it possible to very quickly secure the device to a smooth supporting surface. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:
1. A holding device for tubular articles having in combination, a base, a standard rising therefrom, a member secured to said standard above said base and extending transversely thereto at opposite sides thereof and having spaced vertically facing concave recesses therein at opposite sides of said standard, a cooperating member slidable on said standard and extending transversely thereto at opposite sides thereof and having spaced vertically facing concave recesses formed therein, the same facing oppositely to said first mentioned recesses, the recesses at each side of said standard having their centers in substantially the same vertical line and a spring engaging said last mentioned member at one end and held against movement at its other end to force said last mentioned member toward said first mentioned member to grip a pair of tubular articles between said members and in said recesses.

2. The structure set forth in claim 1, said spring encircling said standard and said standard having an enlarged upper end against which one end of said spring bears.

3. A holding device for tubular articles having in combination, a base, a standard rising therefrom, a member secured to said standards above said base and extending transversely thereto at opposite sides thereof and having spaced concave recesses therein at opposite sides of said standard facing upwardly, a cooperating member slidable on said standard and extending transversely thereto at opposite sides thereof and having spaced downwardly facing concave recesses formed therein at opposite sides of said standard, the recesses at each side of said standard having their centers in substantially the same vertical line, a compression coiled spring mounted on said standard engaging said last mentioned member and means on said standard engaged by the upper end of said spring, said spring acting to force said last mentioned member toward said first mentioned member to grip a pair of tubular articles between said members and in said recesses, said members being of channel shape in cross section with their open sides facing each other and one being of a width to be received within the sides of the other.

4. A holding device for tubular articles having in combination, a base, a standard rising therefrom, a member secured to said standard above said base and extending transversely thereto at opposite sides thereof and having spaced concave recesses therein at opposite sides of said standard respectively, said recesses facing upwardly, a cooperating member slidable on said standard and extending transversely thereof at opposite sides thereof and having spaced downwardly facing concave recesses formed therein at opposite sides of said standard, the recesses at each side of said standards having their centers in substantially the same vertical line and a spring mounted on said standard held for movement at one end and engaging said last mentioned member at its other end to force the same toward said first mentioned member so as to grip a pair of tubular articles between said members and in said recesses, said members each having spaced plate-like sides adapted to engage said tubular articles at longitudinally spaced points thereon respectively.

ARNOLD J. SCHWISOW.